(12) United States Patent
Fu et al.

(10) Patent No.: US 10,885,707 B1
(45) Date of Patent: Jan. 5, 2021

(54) NETWORK, SYSTEM AND METHOD FOR MULTI-VIEW 3D MESH GENERATION VIA DEFORMATION

(71) Applicant: Fudan University, Shanghai (CN)

(72) Inventors: Yanwei Fu, Shanghai (CN); Chao Wen, Shanghai (CN); Yinda Zhang, Shanghai (CN); Zhuwen Li, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 0 days.

(21) Appl. No.: 16/882,477

(22) Filed: May 23, 2020

Related U.S. Application Data (63) Continuation-in-part of application No. 16/519,304, filed on Jul. 23, 2019, now Pat. No. 10,777,003.

(30) Foreign Application Priority Data

Dec. 23, 2019 (CN) .......................... 2019 1 13351738

(51) Int. Cl.
*G06T 17/20* (2006.01)
*H04N 13/275* (2018.01)
*G06N 3/08* (2006.01)
*G06T 7/60* (2017.01)

(52) U.S. Cl.
CPC ............. *G06T 17/205* (2013.01); *G06N 3/08* (2013.01); *G06T 7/60* (2013.01); *H04N 13/275* (2018.05); *G06T 2207/20084* (2013.01)

(58) Field of Classification Search
None
See application file for complete search history.

(56) References Cited

U.S. PATENT DOCUMENTS

| 2013/0096414 A1* | 4/2013 | Lu | ........................ G01R 33/483 600/410 |
| 2019/0197777 A1* | 6/2019 | Steinbrucker | ........... G06F 3/011 |
| 2019/0200886 A1* | 7/2019 | Welsh | ...................... A61B 5/05 |

* cited by examiner

*Primary Examiner* — Michelle Chin
(74) *Attorney, Agent, or Firm* — Brad Bertoglio; Intelink Law Group, P.C.

(57) ABSTRACT

A network for generating 3D shape includes a perceptual network and a Graphic Convolutional Network (GCN). The GCN includes a coarse shape generation network for generating a coarse shape, and a Multi-View Deformation Network (MDN) for refining the coarse shape. The MDN further comprises at least one MDN unit, which in turn comprises a deformation hypothesis sampling module, a cross-view perceptual feature pooling module and a deformation reasoning module. Systems and methods are also provided.

19 Claims, 9 Drawing Sheets
(9 of 9 Drawing Sheet(s) Filed in Color)

| Category | Except | All |
|---|---|---|
| lamp | 10.96 | 11.73 |
| cabinet | 8.88 | 8.99 |
| cellphone | 7.10 | 8.29 |
| chair | 6.49 | 7.86 |
| monitor | 6.06 | 6.60 |
| speaker | 5.75 | 5.98 |
| table | 5.44 | 5.94 |
| bench | 5.30 | 5.87 |
| couch | 3.76 | 4.39 |
| plane | 1.12 | 1.63 |
| firearm | 0.67 | 1.07 |
| watercraft | 0.21 | 1.14 |
| car | 0.14 | 1.18 |

(a) Train except one category (b) Train on one category

NETWORK, SYSTEM AND METHOD FOR MULTI-VIEW 3D MESH GENERATION VIA DEFORMATION

The present patent application is a continuation-in-part of U.S. patent application Ser. No. 16/519,304, filed on Jul. 23, 2019. The present patent applications also claims priority of China patent application no. 201911335173.8, filed on Dec. 23, 2019. The entire content of each application is incorporated herein by reference.

TECHNICAL FIELD

This invention is related to a network for Multi-View 3D mesh generation, and more particularly, for generating 3D mesh via deformation. This invention is also related to a system and a method thereof.

BACKGROUND 3D shape generation has become a popular research topic recently. With the astonishing capability of deep learning, lots of works have been demonstrated to successfully generate a 3D shape from merely a single color image. However, due to limited visual evidence from only one viewpoint, single image based approaches usually produce rough geometry in the occluded area and do not perform well when generalized to test cases from domains other than training, e.g. cross semantic categories.

Adding a few more images (e.g. 3-5) of the object is an effective way to provide the shape generation system with more information about the 3D shape. On one hand, multi-view images provide more visual appearance information, and thus grant the system with more chance to build the connection between 3D shape and image priors. On the other hand, it is well-known that traditional multi-view geometry methods (see "Multiple view geometry in computer vision (2. ed.)", Harltey et al., Cambridge University Press, 2006) accurately infer 3D shape from correspondences across views, which is analytically well defined and less vulnerable to the generalization problem. However, these methods typically suffer from other problems, like large baselines and poorly textured regions.

Though typical multi-view methods are likely to break down with very limited input images (e.g. less than 5), the cross-view connections might be implicitly encoded and learned by a deep model (here the "multi-view" or "cross-view" means taking images of a common object from different views). While well-motivated, there are very few works in the literature exploiting in this direction, and a naive multi-view extension of single image based models does not work well.

There is a need to provide a new and different mechanism for multi-view shape generation.

Before starting to introduce embodiments of the present invention, related work in this area includes 3D shape representations, single view shape generation, and multi-view shape generation.

(1) 3D Shape Representations

Since 3D CNN is readily applicable to 3D volumes, the volume representation has been well-exploited for 3D shape analysis and generation. With the debut of PointNet, the point cloud representation has been adopted. Most recently, the mesh representation (see "Neural 3d mesh renderer", Kato et al., CVPR, 2018; "Pixel2mesh: Generating 3d mesh models from single RGB images", Wang et al., ECCV, 2018) has become competitive due to its compactness and nice surface properties. Some other representations have been proposed, such as geometry images, depth images, classification boundaries, signed distance function, etc., and most of them require post-processing to get the final 3D shape. Consequently, the shape accuracy may vary and the inference takes extra time.

(2) Single View Shape Generation

Classic single view shape reasoning can be traced back to shape from shading, texture and de-focus, which only reason the visible parts of objects. With deep learning, many works leverage the data prior to hallucinate the invisible parts, and directly produce shapes in 3D volume point clouds, mesh models, or as an assembling of shape primitives.

Alternatively, 3D shapes can be also generated by deforming an initialization. Tulsiani et al. ("Learning category-specific deformable 3d models for object reconstruction", IEEE Trans. Pattern Anal. Mach. Intell., 2017) and Kanazawa et al. ("Learning category-specific mesh reconstruction from image collections", ECCV, 2018) learn a category-specific 3D deformable model and reasons the shape deformations in different images. Wang et al. ("Pixel2mesh: Generating 3d mesh models from single rgb images", ECCV, 2018) learns to deform an initial ellipsoid to the desired shape in a coarse to fine fashion.

Combining deformation and assembly, Huang et al. ("Single-view reconstruction via joint analysis of image and shape collections", ACM Trans. Graph., 2015) and Su et al. ("Estimating image depth using shape collections", ACM Trans. Graph., 2014) retrieve shape components from a large dataset and deform the assembled shape to fit the observed image. Kuryenkov et al. ("Deformnet: Free-form deformation network for 3d shape reconstruction from a single image", WACV, 2018) learns free-form deformations to refine shape.

(3) Multi-View Shape Generation

Recovering 3D geometry from multiple views has been well studied. Traditional multi-view stereo (MVS) (Harltey et al., see above) relies on correspondences built via photoconsistency and thus it is vulnerable to large baselines, occlusions, and texture-less regions. Most recently, deep learning based MVS models have drawn attention, and most of these approaches rely on a cost volume built from depth hypotheses or plane sweeps. However, these approaches usually generate depth maps, and it is non-trivial to fuse a full 3D shape from them. On the other hand, direct multi-view shape generation uses fewer input views with large baselines, which is more challenging and has been less addressed.

Choy et al. ("3d-r2n2: A unified approach for single and multi-view 3d object reconstruction", ECCV, 2016) propose a unified framework for single and multi-view object generation reading images sequentially. Kar et al. ("Learning a multi-view stereo machine", NeurIPS, 2017) learn a multi-view stereo machine via recurrent feature fusion. Gwak et al. ("Weakly supervised 3d reconstruction with adversarial constraint", 3DV, 2017) learns shapes from multi-view silhouettes by ray-tracing pooling and further constrains the ill-posed problem using GAN.

SUMMARY

In this application, a deep learning model is proposed to generate the object shape from multiple color images. Especially, it is to focus on endowing the deep model with the capacity of improving shapes using cross-view information. A new network architecture is designed in this application, named Multi-View Deformation Network (MDN), which works in conjunction with the Graph Convolutional Network (GCN) architecture proposed in Pixel2Mesh (see above, Wang et al.) to generate accurate 3D geometry shape in the desirable mesh representation.

Figure 1:
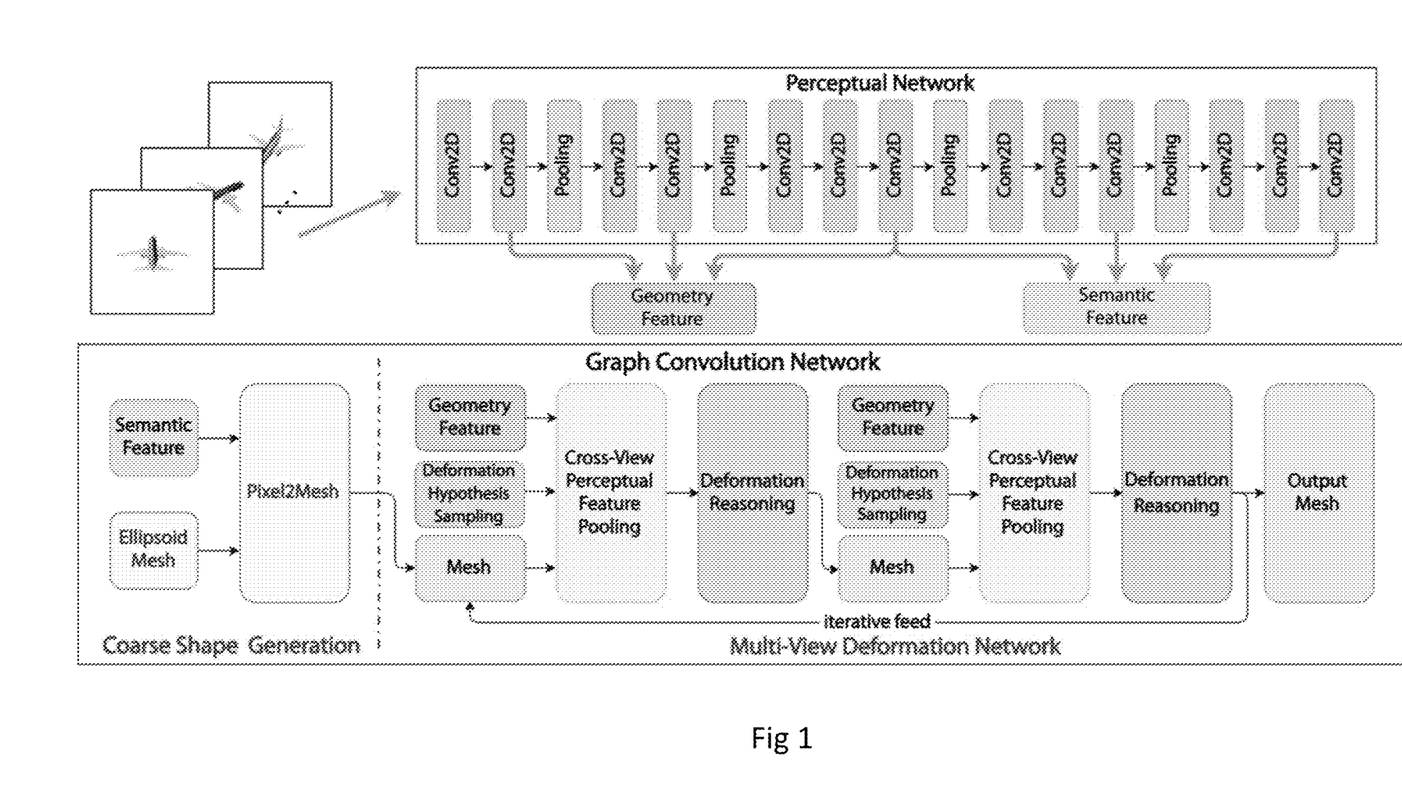
FIG. 1 illustratively shows the system according to one embodiment of this invention.

In Pixel2Mesh, a GCN is trained to deform an initial shape to the target using features from a single image, which often produces plausible shapes but with a lack of accuracy (see FIG. 1, P2M). In this application, the mesh in MDN is further deformed using features carefully pooled from multiple images. Our new MDN proposes hypothesis deformations for each vertex and moves it to the optimal location that best explains features pooled from multiple views. By imitating correspondences search rather than learning priors, MDN generalizes well in various aspects, such as cross semantic category, number of input views, and the mesh initialization.

In one aspect of this invention, it is provided a network for generating a 3D shape, including a perceptual network and a Graphic Convolutional Network (GCN), wherein the perceptual network is so configured to extract geometry features and semantic features from a plurality of input images;

the GCN includes a coarse shape generation network for generating a coarse shape, and a Multi-View Deformation Network (MDN) for refining the coarse shape; wherein the coarse shape generation network is so configured as to output a coarse mesh based on the semantic features extracted from the perceptual network and an initial ellipsoid mesh;

the MDN comprises at least one MDN unit, which comprises a deformation hypothesis sampling module, a cross-view perceptual feature pooling module and a deformation reasoning module; wherein the deformation hypothesis sampling module is so configured that a set of deformation hypotheses positions are sampled for each vertex of the coarse mesh from its surrounding area;

the cross-view perceptual feature pooling module is serial to the deformation hypothesis sampling module, and is so configured as to pool the geometry features for each vertex and its hypotheses positions in a cross-view manner;

the deformation reasoning module is serial to the cross-view perceptual feature pooling module, and is so configured to outputs a refined mesh based on the pooled geometry features of each vertex and its hypotheses positions.

Preferably, the MDN includes more than one MDN units serially connected, and the refined mesh output from a preceding MDN unit is iteratively used as the coarse mesh of the superseding MDN unit.

Preferably, the number of the MDN units is two.

Preferably, the perceptual network is preferably a 2D Convolutional Neural Network (CNN).

Preferably, the geometry features are extracted from early layers of the 2D CNN.

Preferably, the perceptual network includes a VGG-16 architecture for extracting the geometry features and semantic features.

Preferably, the coarse shape generation network is a Pixel2Mesh network.

Preferably, the Pixel2Mesh Network is trained from a single view.

Preferably, the Pixel2Mesh Network is trained from multiple views.

Preferably, the Pixel2Mesh Network is equipped with a cross-view perceptual feature pooling layer.

Preferably, the set of deformation hypotheses positions are sampled from an icosahedron centered on the vertex.

Preferably, the icosahedron is a level-1 icosahedron.

Preferably, the set of deformation hypotheses positions are sampled with a scale of 0.02, as the size of the icosahedron is normalized as 1.

Preferably, a local graph is built with edges on the icosahedron surface and additional edges between the hypotheses positions to the vertex in the center.

Preferably, to pool the geometry features for each vertex and its hypotheses positions in a cross-view manner includes finding the projections for each vertex and its hypothesis positions in the planes of the plurality of input images and then pooling the geometry features for each vertex and its hypothesis positions.

Preferably, the projections of each vertex and its hypothesis position are found in the planes of the plurality of input images by using known camera intrinsics and extrinsics.

Preferably, the geometry features of each vertex and its hypothesis positions are pooled four neighboring feature blocks.

Preferably, the geometry features of each vertex and its hypothesis positions are pooled by using bilinear interpolation.

Preferably, the feature statistics pooled from all views for each vertex, including mean, max, and std, are concatenated.

Preferably, a 3-dimensional vertex coordinate is concatenated into a feature vector.

Preferably, the deformation reasoning module includes a differentiable network component.

Preferably, the differentiable network component is a scoring network.

Preferably, the pooled perceptual features of each vertex and its hypotheses positions are fed into the scoring network.

Preferably, a weight for each vertex and its hypotheses positions is estimated in the scoring network, and a weighted sum of the vertex and all of its hypotheses positions for each vertex is calculated based on the weight of each vertex and its hypotheses positions and the pooled geometry features of each vertex and its hypotheses positions;

Preferably, the coordinates for each vertex is obtained from the weighted sum of the vertex, and the refined mesh is generated according to the coordinates of each vertex.

Preferably, the scoring network is a G-ResNet.

Preferably, the scoring network consists of 6 graph residual convolution layers, wherein each layer is added with a Rectifier Linear Unit (ReLU).

In another aspect of this invention, it is provided a system for generating 3D shape, including an input device, a processor for processing the input data, and an output device for outputting the processed data; wherein the processor is configured to build a computing model as the network as the aspect stated above.

In one further aspect of this invention, it is provided a method for generating 3D shape, including steps as follows, A: extracting geometry features and semantic features from a plurality of input images;

B: generating a coarse mesh from an initial ellipsoid mesh based on the extracted semantic features;

C: sampling a set of deformation hypotheses positions for each vertex of the coarse mesh from its surrounding area;

D: pooling the geometry features for each vertex and hypotheses positions in a cross-view manner;

E: estimating a weight for each vertex and its hypotheses positions, and

F: calculating a weighted sum of the vertex and all of its hypotheses positions for each vertex, based on the weight of each vertex and its hypotheses positions and the pooled geometry features of each vertex and its hypotheses positions;

G: obtaining coordinates for each vertex from the weighted sum of the vertex; and H: outputting a deformation mesh based on the coordinates of each vertex.

Preferably, iteratively executing the steps D, E, F and G for more than one times.

Preferably, iteratively executing the steps D, E, F and G for two times.

Preferably, the step of pooling the geometry features for each vertex and hypotheses positions in a cross-view manner includes finding projections of each vertex and its hypothesis positions in the planes of the plurality of input images and pooling geometry features for them based on the extracted geometry features;

Preferably, using known camera intrinsics and extrinsics for finding projections of each vertex and its hypothesis positions in the planes of the plurality of input images includes.

Preferably, using bilinear interpolation for pooling geometry features for each vertex and its hypothesis positions.

Preferably, pooling geometry features for each vertex and its hypothesis positions from four neighboring feature blocks.

Preferably, iteratively executing the whole method for three times.

In the MDN of this application, which is fundamentally different from the existing methods, it is to learn a GCN to deform the mesh using features pooled from all input images at once, rather than sequentially feeding in images.

In general, good properties of this application (due to the MDN) at least includes the points as follows.

First, it can be trained end-to-end. Note that it is non-trivial since MDN searches deformation from hypotheses, which requires a non-differentiable argmax/min. In this application, a differentiable 3D soft argmax is applied, which takes a weighted sum of the sampled hypotheses as the vertex deformation.

Second, it works with varying number of input views in a single forward pass. This requires the feature dimension to be invariant with the number of inputs, which is typically broken when aggregating features from multiple images (e.g. when using concatenation). The input number invariance is achieved by concatenating the statistics (e.g. mean, max, and standard deviation) of the pooled feature, which further maintains input order invariance. It is found that this statistics feature encoding explicitly provides the network cross-view information, and encourages it to automatically utilize image evidence when more are available.

Last but not least, the nature of "generation via deformation" allows an iterative refinement. In particular, the model output can be taken as the input, and quality of the 3D shape is gradually improved throughout iterations.

BRIEF DESCRIPTION OF DRAWINGS

The foregoing summary, as well as the following detailed description, will be better understood when read in conjunction with the appended drawings. For the purpose of illustration, there are shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

The patent or application file contains at least one drawing executed in color. Copies of this patent or patent application publication with color drawing(s) will be provided by the Office upon request and payment of the necessary fee.

Wherein.

DETAILED DESCRIPTION

Before explaining at least one embodiment of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation-specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

Embodiments of the subject matter and the functional operations described in this specification optionally can be implemented in digital electronic circuitry, or in computer software, firmware, or hardware, including the structures disclosed in this specification and their structural equivalents, or in combinations of one or more of them. Embodiments of the subject matter described in this specification can, for example, be implemented as one or more computer program products, e.g., one or more modules of computer program instructions encoded on a computer readable medium for execution by, or to control the operation of, data processing apparatus.

The computer readable medium can be a machine readable tangible storage device, a machine readable tangible storage substrate, a tangible memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A computer program (also known as a program, software, software application, script, or code), can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, byway of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

FIG. 1 illustratively shows the system according to one embodiment of this invention. The whole system generally consists of a perceptual network for extracting image features and a GCN for deforming an ellipsoid mesh to target shape.

The perceptual network is preferably a 2D CNN (Convolutional Neural Network). Geometry features and semantic features are extracted from input images via the 2D CNN.

The GCN includes a coarse shape generation network (e.g. a Pixel2Mesh network), and Multi-View Deformation Network (MDN) for shape refinement. The semantic features and the initial ellipsoid mesh are input to the Pixel2Mesh Network, which is preferably trained either from single or multiple views. A coarse shape is generated from the Pixel2Mesh Network. It is plausible but rough, and will be refined in the Multi-View Deformation Network to add detail. The refinement is preferably iterative.

For initialization, the Pixel2Mesh Network is used to generate a coarse shape with e.g. 2466 vertices. To improve the quality of initial mesh, the Pixel2Mesh Network is equipped with the cross-view perceptual feature pooling layer in this application, which allows it to pool features (e.g. semantic features) from multiple views. The output of the Pixel2Mesh Network is a coarse mesh, which is marked as "mesh" in FIG. 1. This "mesh" is separately marked in the figure because of the iterative structure, which will be described in detail hereinafter.

The Multi-View Deformation Network is the core of system to enable the network exploiting cross-view information for shape generation. It first generates deformation hypotheses positions for each vertex and then learns to reason an optimum using feature pooled from inputs. It generally comprises a deformation hypothesis sampling module, a cross-view perceptual feature pooling module and a deformation reasoning module. Such structure which comprises one deformation hypothesis sampling module, one cross-view perceptual feature pooling module and one deformation reasoning module can be summarized as a unit. The MDN can comprise one or more such units. As can be seen in FIG. 1, there are two units connected serially, with the output refined mesh of the deformation reasoning module of the preceding unit being used as the input coarse mesh of the deformation hypothesis sampling module of the superseding unit. Preferably, there are three such units in the MDN.

Figure 2:
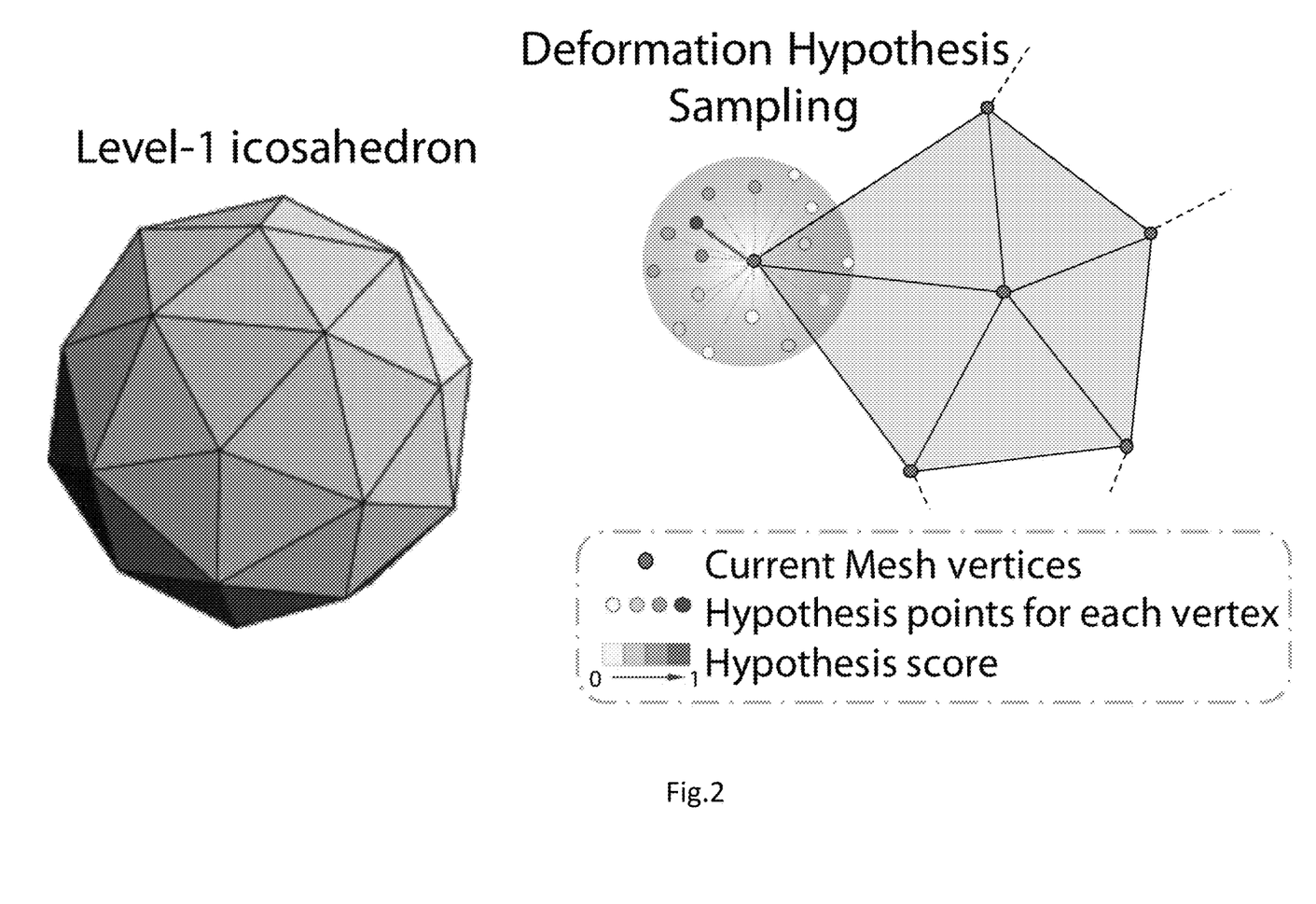
FIG. 2 illustratively shows the deformation hypothesis sampling module according to one embodiment of this application.

FIG. 2 illustratively shows the deformation hypothesis sampling module according to one embodiment of this application.

In MDN, the first step is to propose deformation hypotheses positions for each vertex, namely, a set of deformation hypotheses positions are first sampled for each vertex of the coarse mesh from its surrounding area. This is equivalent as sampling a set of target locations in 3D space where the vertex can be possibly moved to.

In this embodiment, to uniformly explore the nearby area, it is sampled from a level-1 icosahedron centered on the vertex with a scale of 0.02 (as the size of the icosahedron normalized as 1), which results in 42 hypothesis positions (see FIG. 2, left). It is then to build a local graph with edges on the icosahedron surface and additional edges between the hypotheses positions to the vertex in the center, which forms a graph with 43 nodes and 120+42=162 edges. Such local graph is built for all the vertices, and then used to predict vertex movements (see FIG. 2, right).

Figure 3:
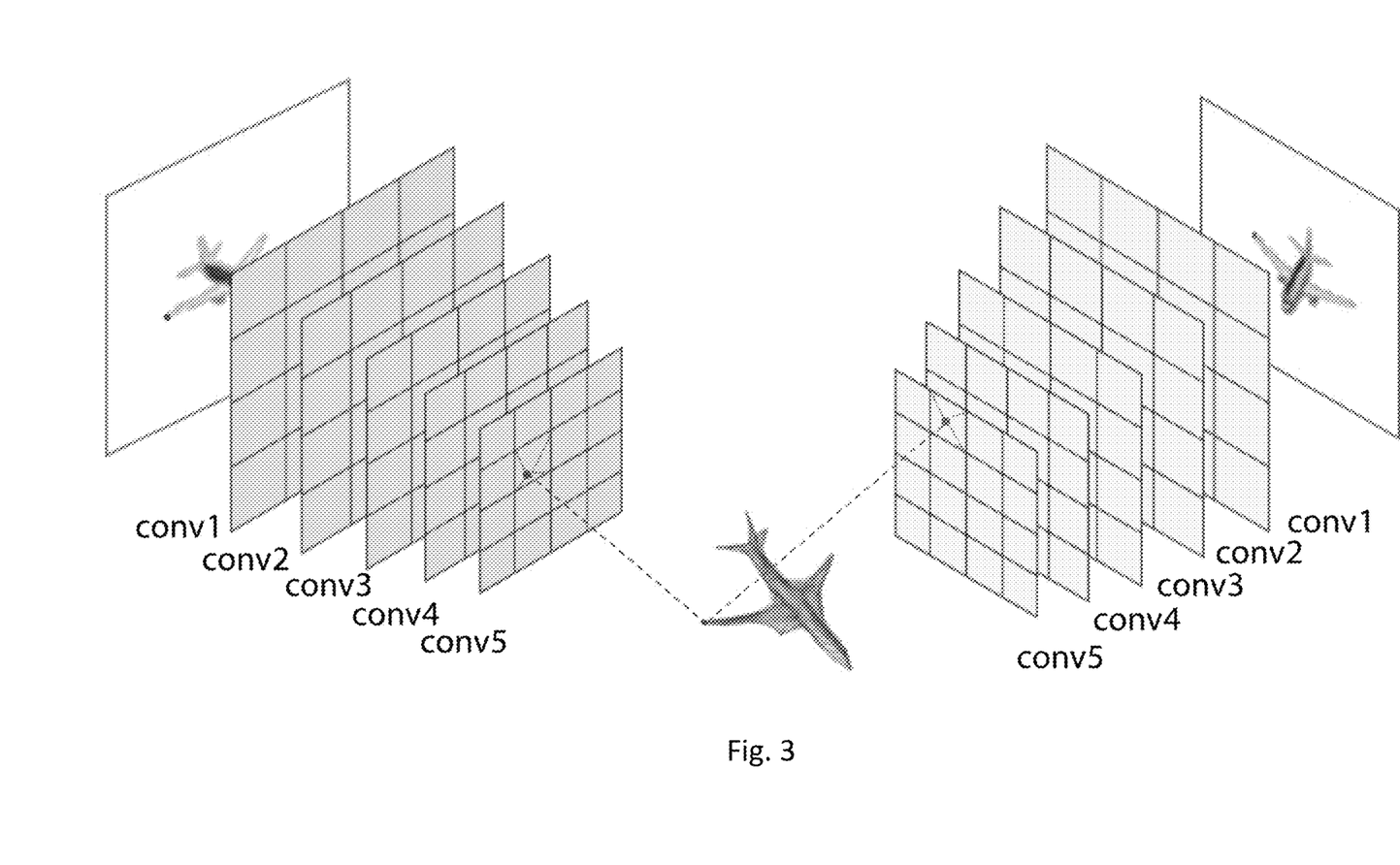
FIG. 3 illustratively shows the cross-view perceptual feature pooling module according to one embodiment of this application.

FIG. 3 illustratively shows the cross-view perceptual feature pooling module according to one embodiment of this application.

The second step in MDN is to assign each node in the GCN the features from the multiple input color images. As seen in FIG. 1, the input of the cross-view perceptual feature pooling module includes the geometry features extracted from the perceptual network, the output of the deformation hypothesis sampling module, and the coarse mesh (the output of the Pixel2Mesh network). Please note that this coarse mesh is firstly input to the deformation hypothesis sampling module to generate the hypothesis positions (see FIG. 4 for details). Again, this "mesh" separately marked in FIG. 1 for illustrating the iterative structure.

For each hypothesis position, their perceptual features (e.g. geometry features) are pooled from those geometry features extracted from early layers of the perceptual network, where the feature resolution is high and contains more low-level geometry information. The 3D vertex coordinates of each vertex and hypothesis position are projected to the multiple 2D image planes using e.g. camera intrinsics and extrinsics. Perceptual features are pooled using e.g. bilinear interpolation, and feature statistics are kept on each hypothesis.

In the embodiment, e.g. a VGG-16 architecture is used to extract perceptual features in the perceptual network. Camera poses are assumed known. Then for each vertex and hypothesis position, their projections are findable in all input color image planes using known camera intrinsics and extrinsics, and features are poolable from four neighboring feature blocks by using bilinear interpolation (see FIG. 3). In this embodiment, instead of pooling e.g. high level features from later layers of the VGG (i.e. 'conv3\_3', 'conv4\_3', and 'conv5\_3') to better learn shape priors, it is to pool features from early layers (i.e. 'conv1\_2', 'conv2\_2', and 'conv3\_3'), which are in high spatial resolution and maintaining more detailed information.

In this embodiment, some statistics (e.g. mean, max, and std) of the features pooled from all views for each vertex are concatenated, which makes the network naturally adaptive to variable input views and behave invariant to different input orders. This also encourages the network to learn from cross-view feature correlations rather than each individual feature vector. In addition to image features, it is preferable to concatenate the 3-dimensional vertex coordinate into the feature vector.

Figure 4:
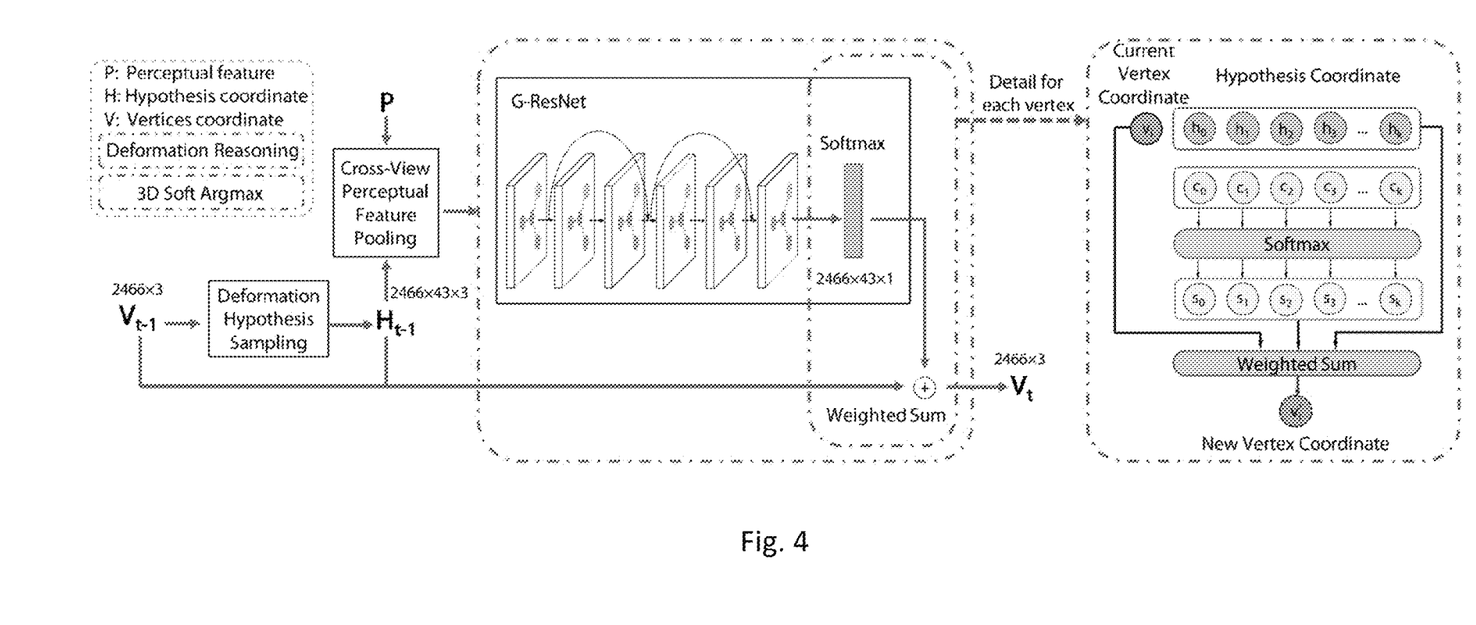
FIG. 4 illustratively shows the deformation reasoning module according to one embodiment of this application.

FIG. 4 illustratively shows the deformation reasoning module according to one embodiment of this application. It is shown in conjunction with the deformation hypothesis sampling module and the cross-view perceptual feature pooling module for purpose of a better understanding.

The third step in the MDN is to reason an optimal deformation for each vertex from the hypotheses positions using pooled cross-view perceptual features. As seen in FIG. 1, the deformation reasoning module is serial to the cross-view perceptual feature pooling module.

Please note that picking the best hypothesis of all needs an "argmax" operation, which requires stochastic optimization and usually is not optimal. Instead, in this application a differentiable network component (a scoring network) is designed to produce desirable deformation through soft-argmax of the 3D deformation hypotheses, as shown in FIG. 4.

Specifically, it is first to feed the pooled cross-view perceptual feature into the scoring network, which is e.g. a G-ResNet (see FIG. 4, surrounded by orange dashed lines). This scoring network is consisting of 6 graph residual convolution layers, where each layer is added with a Rectifier Linear Unit (ReLU), to predict a scalar weight $c_i$ for each hypothesis. All the weights are then fed into a softmax layer (see FIG. 4, surrounded by blue dashed lines) and normalized to scores $s_i$, with $$\sum_{i=1}^{43} s_i = 1.$$

The vertex location is then updated as the weighted sum of all the hypotheses, i.e.

$$v = \sum_{i=1}^{43} s_i * h_i,$$

where $h_i$ is the location of each deformation hypothesis including the vertex itself.

In FIG. 4, the mark "2466×3" means 2466 vertices each has a 3D dimensional coordinate; the mark "2466×43×3" means for each of the 2466 vertices, a graph with 43 nodes is generated, and each nodes has a 3D dimensional coordinate; the mark "2466×43×1" means for each of the 2466 vertices, a graph with 43 nodes is generated, and for each node a score is calculated (only 1 dimension for the score).

The details for each vertex are enlarged in the right part of FIG. 4, wherein the weight (see green circles, $c_0, c_1 \ldots c_k$) is estimated for each hypothesis by using the G-ResNet, and then the weights are normalized by a softmax layer (see yellow circles, $s_0, s_1 \ldots s_k$). The output deformation is the weighted sum of all the deformation hypotheses.

This deformation reasoning module runs on all local GCN (here the G-ResNet) built upon every vertex with shared weights, as we expect all the vertices leveraging multi-view feature in a similar fashion.

The model of this application is trained using ground truth 3D CAD models. The loss function includes all terms from Pixel2Mesh, but extends the Chamfer distance loss to a re-sampled version. Chamfer distance measures "distance" between two point clouds, which can be problematic when points are not uniformly distributed on the surface. In this application, it is proposed to randomly re-sample the predicted mesh when calculating Chamfer loss using the re-parameterization trick (see "From point clouds to mesh using regression", Ladicky et al., ICCV, 2017).

Specifically, given a triangle defined by 3 vertices $\{v_1, v_2, v_3\} \in \mathbb{R}^3$, a uniform sampling can be achieved by:

$$s=(1-\sqrt{r_1})v_1+(1-r_2)\sqrt{r_1 v_2}+r_1 r_2 v_1$$

where s is a point inside the triangle, and $r_1, r_2 \sim U[0,1]$.

When calculating the loss, it is to uniformly sample the generated mesh for 4000 points, with the number of points per triangle proportional to its area. This is sufficient to produce a uniform sampling on the output mesh with 2466 vertices, and calculating Chamfer loss on the re-sampled point cloud, containing 6466 in total, helps to remove artifacts in the results.

Experiments

In this section, we perform extensive evaluation of the model of this invention for multi-view shape generation. Comparison are made to state-of-the-art methods, and controlled experiments are conducted with regard to various aspects, e.g. cross category generalization, quantity of inputs, etc.

The dataset provided by Choy (see supra, "3DR2N2") is adopted as it is widely used by many existing 3D shape generation works. The dataset is created using a subset of ShapeNet (see "Shapenet: An information-rich 3d model repository", Chang et al., arXiv preprint arXiv:1512.03012, 2015) containing 50 k 3D CAD models from 13 categories. Each model is rendered from 24 randomly chosen camera viewpoints, and the camera intrinsic and extrinsic parameters are given. For fair comparison, the same training/testing split as in Choy are used for all the experiments of this invention.

Standard evaluation metrics are used for 3D shape generation. Following Fan (see "A point set generation network for 3d object reconstruction from a single image", CVPR, 2017), it is to calculate Chamfer Distance (CD) between points clouds uniformly sampled from the ground truth and the invention prediction to measure the surface accuracy. It is also to use F-score following Wang (see supra, "Pixel2Mesh") to measure the completeness and precision of generated shapes. For CD, the smaller is better. For F-score, the larger is better.

Previous works for multi-view shape generation are compared with. It is shown that the MDN in this application take effects in improving shape quality. Most shape generation methods take only a single image, but Choy (see supra, "3DR2N2") and Kar (see supra, "LSM") work in the same setting with us.

It is also to build two competitive baselines using Pixel2Mesh. In the first baseline (see Tab.1, P2M-M), it is to directly run single-view Pixel2Mesh on each of the input image and fuse multiple results. In the second baseline (see Tab.1, MVP2M), it is to replace the perceptual feature pooling to the cross-view version of this invention to enable Pixel2Mesh for the multi-view scenario.

TABLE 1

| Category | F-score($\tau$) ↑ | | | | | F-score($2\tau$) ↑ | | | | |
| --- | --- | --- | --- | --- | --- | --- | --- | --- | --- | --- |
|  | 3DR2N2† | LSM | MVP2M | P2M-M | Ours | 3DR2N2† | LSM | MVP2M | P2M-M | Ours |
| Couch | 45.47 | 43.02 | 53.17 | 53.70 | 57.56 | 59.97 | 55.49 | 73.24 | 72.04 | 75.33 |
| Cabinet | 54.08 | 50.80 | 56.85 | 63.55 | 65.72 | 64.42 | 60.72 | 76.58 | 79.93 | 81.57 |
| Bench | 44.56 | 49.33 | 60.37 | 61.14 | 66.24 | 62.47 | 65.92 | 75.69 | 75.66 | 79.67 |
| Chair | 37.62 | 48.55 | 54.19 | 55.89 | 62.05 | 54.26 | 64.95 | 72.36 | 72.36 | 77.68 |
| Monitor | 36.33 | 43.65 | 53.41 | 54.50 | 60.00 | 48.65 | 56.33 | 70.63 | 70.51 | 75.42 |
| Firearm | 55.72 | 56.14 | 79.67 | 74.85 | 80.74 | 76.79 | 73.89 | 89.08 | 84.82 | 89.29 |
| Speaker | 41.48 | 45.21 | 48.90 | 51.61 | 54.88 | 52.29 | 56.65 | 68.29 | 68.53 | 71.46 |
| Lamp | 32.25 | 45.58 | 50.82 | 51.00 | 62.56 | 49.38 | 64.76 | 65.72 | 64.72 | 74.00 |
| Cellphone | 58.09 | 60.11 | 66.07 | 70.88 | 74.36 | 69.66 | 71.39 | 82.31 | 84.09 | 86.16 |
| Plane | 47.81 | 55.60 | 75.16 | 72.36 | 76.79 | 70.49 | 76.39 | 86.38 | 82.74 | 86.62 |
| Table | 48.78 | 48.61 | 65.95 | 67.89 | 71.89 | 62.67 | 62.22 | 79.96 | 81.04 | 84.19 |
| Car | 59.86 | 51.91 | 67.27 | 67.29 | 68.45 | 78.31 | 68.20 | 84.64 | 84.39 | 85.19 |
| Watercraft | 40.72 | 47.96 | 61.85 | 57.72 | 62.99 | 63.59 | 66.95 | 77.49 | 72.96 | 77.32 |
| Mean | 46.37 | 49.73 | 61.05 | 61.72 | 66.48 | 62.53 | 64.91 | 77.10 | 76.45 | 80.30 |

Tab. 1 shows quantitative comparison in F-scores on each semantic category. The notation † indicates the methods which does not require camera extrinsic.

As can be seen, the baselines of this invention already outperform other methods, i.e. 3DR2N2 and LSM, which shows the advantage of mesh representation in finding surface details. Moreover, directly equipping Pixel2Mesh with multi-view features does not improve too much (even slightly worse than the average of multiple runs of single-view Pixel2Mesh), which shows dedicate architecture is required to efficiently learn from multi-view features. In contrast, our Multi-View Deformation Network significantly further improves the results from the MVP2M baseline (i.e. our coarse shape initialization).

Figure 5:
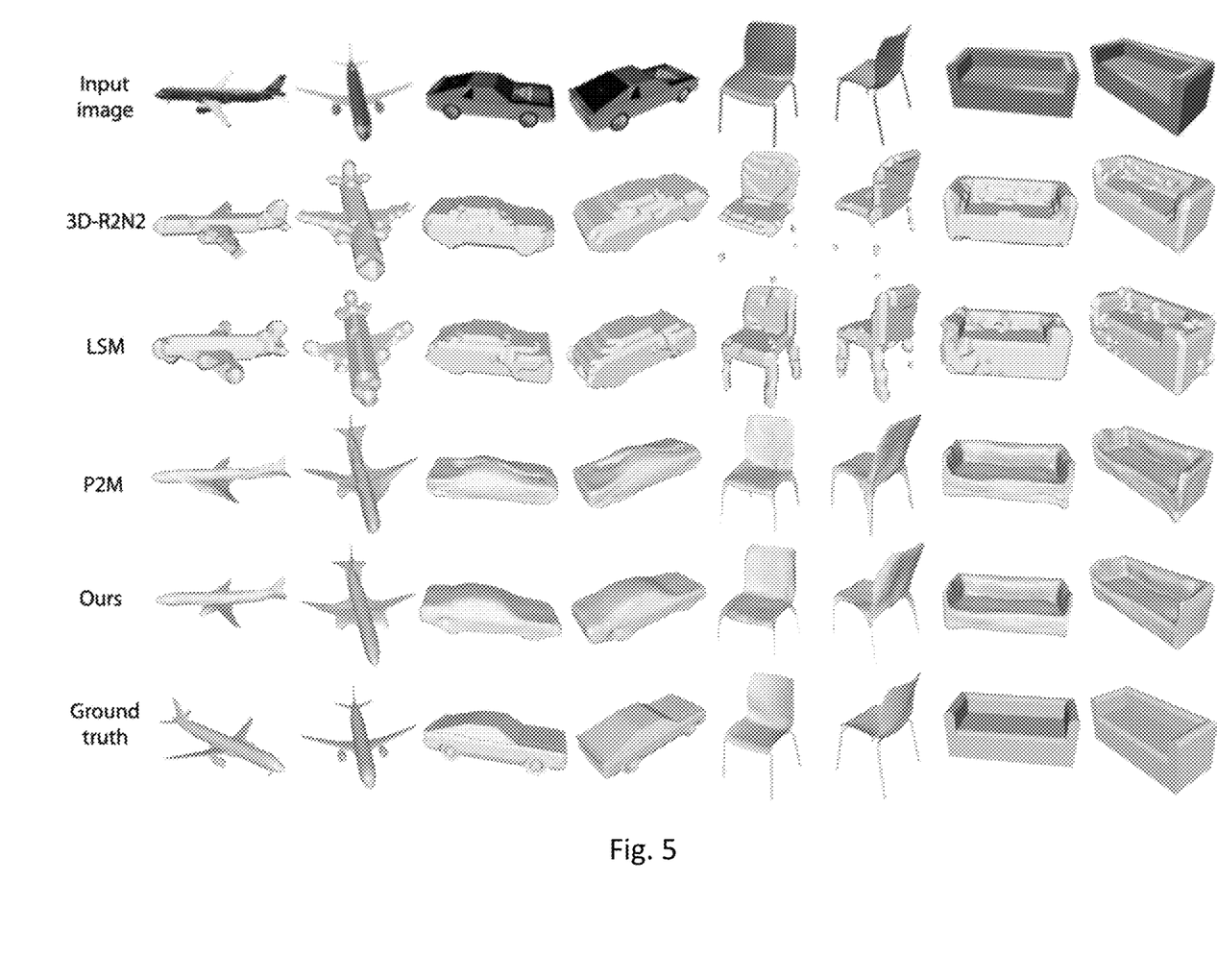
FIG. 5 illustrative shows more qualitative results of the comparison between the model according to this application and the prior works.

FIG. 5 illustrative shows more qualitative results of the comparison. From top to bottom, it is shown in each row: two camera views, results of 3DR2N2, LSM, multi-view Pixel2Mesh, ours, and the ground truth.

Results from different methods are shown aligned with one input view (left) and a random view (right). As can be seen, Choy (3D-R2N2) and Kar (LSM) produce 3D volume, which lose thin structures and surface details. Pixel2Mesh (P2M) produces mesh models but shows obvious artifacts when visualized in viewpoint other than the input. In comparison, our results contain better surface details and more accurate geometry learned from multiple views.

In this invention, the generalization capability of MDN is investigated in many aspects to improve the initialization mesh. For all the experiments in this section, it is to fix the coarse stage and train/test MDN under different settings.

Figure 6:
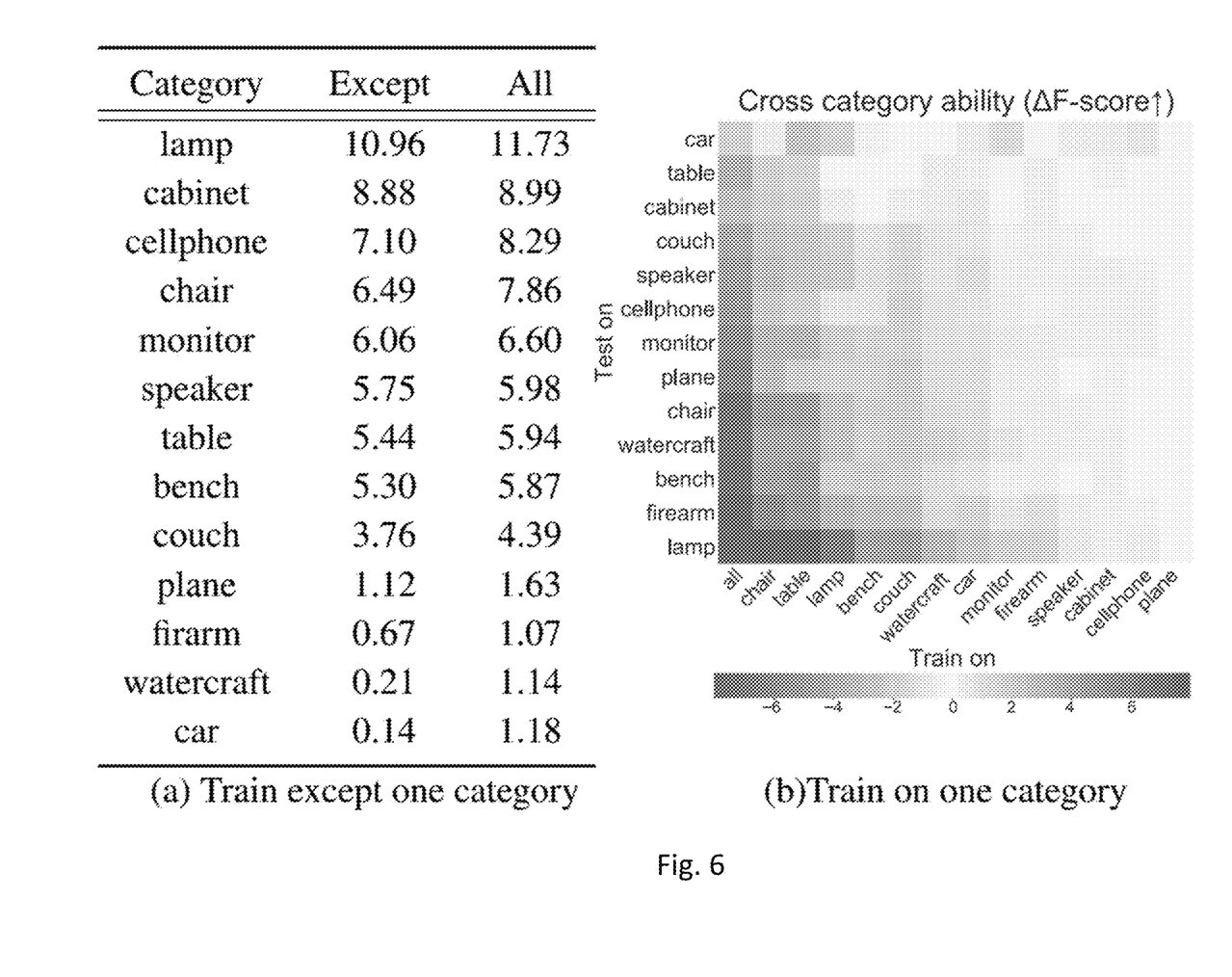
FIG. 6 illustratively shows the Cross-Category Generalization ability of the model according to this application.

FIG. 6 illustratively shows the Cross-Category Generalization, wherein each block represents the experiment with MDN trained on horizontal category and tested on vertical category. Both FIG. 6 (a) and FIG. 6 (b) show improvements of Fscore($\tau$) upon MVP2M through MDN.

It is first to verify how the network of this invention generalizes across semantic categories. The initial MVP2M is fixed and MDN is trained with 12 out 13 categories while tested on the one left out. The improvements upon initialization is shown in FIG. 6 (a).

As can be seen, the performance is only slightly lower when the testing category is removed from the training set compared to the model trained using all categories.

To make it more challenging, it is also to train MDN on only one category and test on all the others.

Surprisingly, MDN still generalizes well between most of the categories, as shown in FIG. 6(b).

Strong generalizing categories (e.g. chair, table, lamp) tend to have relatively complex geometry, thus the model has better chance to learn from cross-view information. On the other hand, categories with super simple geometry (e.g. speaker, cellphone) do not help to improve other categories, even not for themselves. On the whole, MDN shows good generalization capability across semantic categories.

It is then to test how MDN performs with regard to the number of input views. Table 2 shows the performance with regard to the input view numbers.

TABLE 2

| #train | #test | 2 | 3 | 4 | 5 |
|---|---|---|---|---|---|
| 3 | F-score($\tau$) ↑ | 64.48 | 66.44 | 67.66 | 68.29 |
| | F-score($2\tau$) ↑ | 78.74 | 80.33 | 81.36 | 81.97 |
| | CD↓ | 0.515 | 0.484 | 0.468 | 0.459 |
| Resp. | F-score($\tau$) ↑ | 64.11 | 66.44 | 68.54 | 68.82 |
| | F-score($2\tau$)↑ | 78.34 | 80.33 | 81.56 | 81.99 |
| | CD↑ | 0.527 | 0.484 | 0.467 | 0.452 |

In Tab. 2, it is seen that MDN consistently performs better when more input views are available, even though the number of views is fixed as 3 for efficiency during the training. This indicates that features from multiple views are well encoded in the statistics, and MDN is able to exploit additional information when seeing more images.

For reference, it is to train five MDNs with the input view number fixed at 2 to 5 respectively. As shown in Tab. 2 "Resp.", the 3-view MDN performs very close to models trained with more views (e.g. 4 and 5), which shows the model learns efficiently from fewer number of views during the training. The 3-view MDN also outperform models trained with less views (e.g. 2), which indicates additional information provided during the training can be effectively activated during the test even when observation is limited. Overall, MDN generalizes well to different number of inputs.

Lastly, it is to test if the model overfits to the input initialization, i.e. the MVP2M. To this end, translation and random noise are added to the rough shape from MVP2M. The mesh converted from 3DR2N2 using marching cube (see "Marching cubes: Ahigh resolution 3d surface construction algorithm", Lorensen et al., SIGGRAPH, 1987) is also taken as input.

Figure 7:
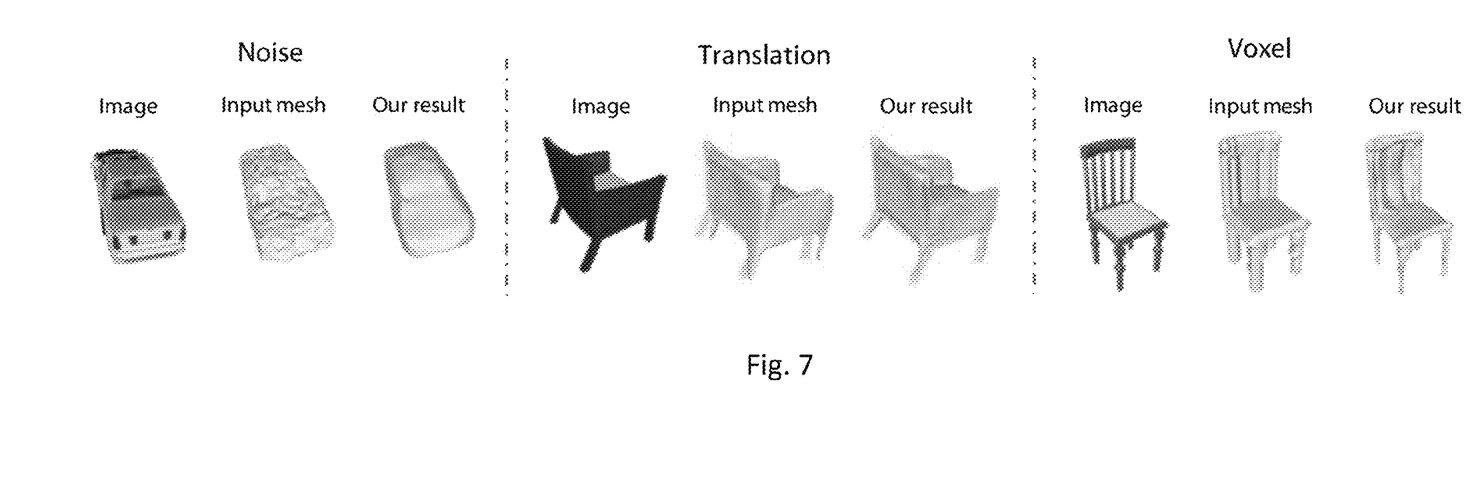
FIG. 7 illustratively shows the robustness to initialization of the model according to this invention.

FIG. 7 illustratively shows the robustness to initialization. As shown, MDN successfully removes the noise, aligns the input with ground truth, and adds significant geometry details.

In the ablation study, we verify the qualitative and quantitative improvements from statistic feature pooling, re-sampled Chamfer distance, and iterative refinement.

Figure 8:
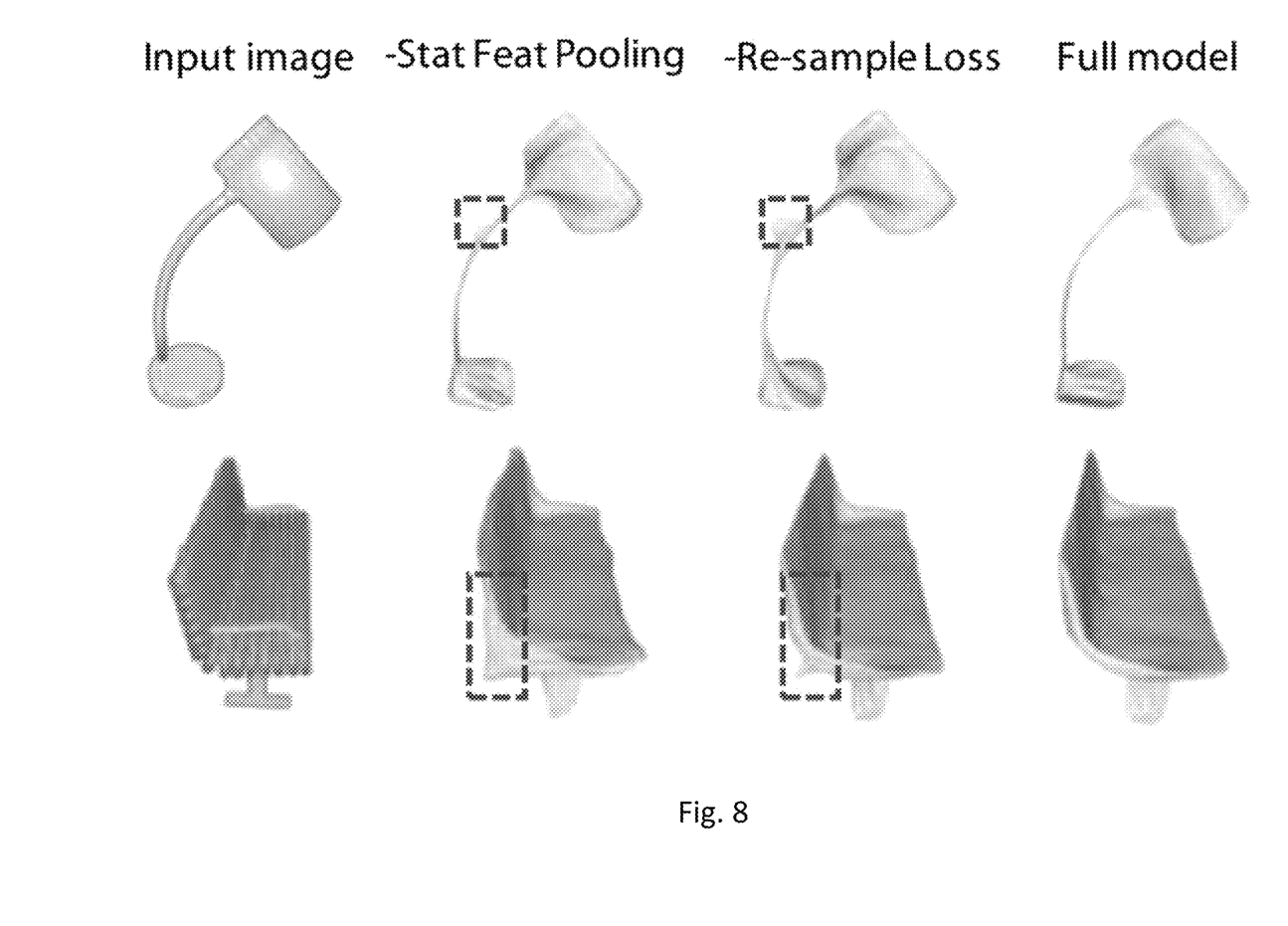
FIG. 8 shows the qualitative result of the Ablation Study of the model according to this invention.

Table 3 shows the quantitative result of the Ablation Study, while FIG. 8 shows the qualitative result of the Ablation Study. In both table and figure, we show meshes from the MDN with statistics feature or re-sampling loss disabled.

TABLE 3

| Metrics | F-score($\tau$)↑ | F-score($2\tau$)↑ | CD↓ |
|---|---|---|---|
| Feat Stat | 65.26 | 79.13 | 0.511 |
| Re-sample Loss | 66.26 | 80.04 | 0.496 |
| Full Model | 66.48 | 80.30 | 0.486 |

It is first to check the importance of using feature statistics. MDN is trained with the ordinary concatenation. This maintains all the features loss-less to potentially produce better geometry, but does not support variable number of inputs anymore. Surprisingly, the model of this application with feature statistics (see Tab.3, "Full Model") still outperforms the one with concatenation (see Tab. 3 "-Feat Stat"). This is probably because our feature statistics are invariant to the input order, such that the network learns more efficiently during the training. It also explicitly encodes cross-view feature correlations, which can be directly leveraged by the network.

It is then to investigate the impact of the re-sampled Chamfer loss. The model of this invention is trained by using the traditional Chamfer loss only on mesh vertices as defined in Pixel2Mesh, and all metrics drop consistently (see Tab. 3, "-Re-sample Loss"). Intuitively, our re-sampling loss is especially helpful for places with sparse vertices and irregular faces, such as the elongated lamp neck as shown in FIG. 8, 3rd column. It also prevents big mistakes from happening on a single vertex, e.g. the spike on bench, where our loss penalizes a lot of sampled points on wrong faces caused by the vertex but the standard Chamfer loss only penalizes one point.

Figure 9:
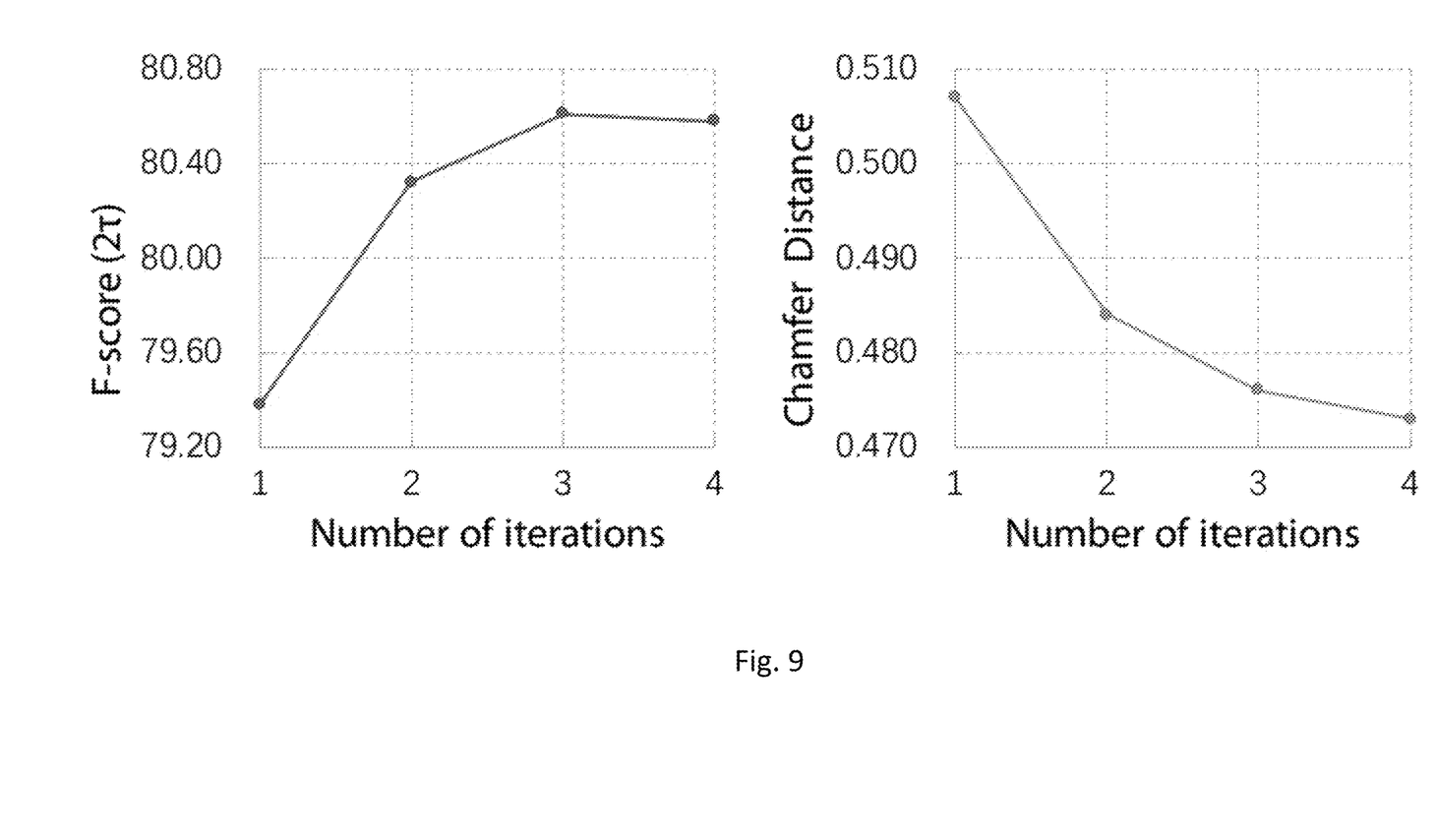
FIG. 9 illustratively shows the performance with different iterations of the model according to this invention.

FIG. 9 illustratively shows the performance with different iterations. As can be seen, the performance of our model keeps improving with more iterations, and is roughly saturated at three. Therefore, it may be preferable to run three iterations during the inference even though marginal improvements can be further obtained from more iterations.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

The invention claimed is:

1. A network for generating 3D shape, comprising a perceptual network and a Graphic Convolutional Network (GCN), wherein:
the perceptual network is configured to extract geometry features and semantic features from a plurality of input images;
the GCN comprises a coarse shape generation network for generating a coarse shape, and a Multi-View Deformation Network (MDN) for refining the coarse shape; wherein
the coarse shape generation network is so configured as to output a coarse mesh based on the semantic features extracted from the perceptual network and an initial ellipsoid mesh;
the MDN comprises at least one MDN unit, which comprises a deformation hypothesis sampling module, a cross-view perceptual feature pooling module and a deformation reasoning module; wherein
the deformation hypothesis sampling module is so configured that a set of deformation hypotheses positions are sampled for each vertex of the coarse mesh from its surrounding area;
the cross-view perceptual feature pooling module is serial to the deformation hypothesis sampling module, and is so configured as to pool the geometry features for each vertex and its hypotheses positions in a cross-view manner; and
the deformation reasoning module is serial to the cross-view perceptual feature pooling module, and is so configured to output a refined mesh based on the pooled geometry features of each vertex and its hypotheses positions.

2. The network of claim 1, wherein the MDN includes more than one serially connected MDN units, and the refined mesh output from a preceding MDN unit is iteratively used as the coarse mesh input to the superseding MDN unit.

3. The network of claim 2, wherein the number of the MDN units is two.

4. The network of claim 1, wherein the perceptual network is preferably a 2D Convolutional Neural Network (CNN).

5. The network of claim 4, wherein the geometry features are extracted from early layers of the 2D CNN.

6. The network of claim 1, wherein the coarse shape generation network is a Pixel2Mesh network.

7. The network of claim 6, wherein the Pixel2Mesh network is equipped with a cross-view perceptual feature pooling layer.

8. The network of claim 1, wherein the set of deformation hypotheses positions are sampled from an icosahedron centered on the vertex.

9. The network of claim 8, wherein the icosahedron is a level-1 icosahedron.

10. The network of claim 8, wherein, the set of deformation hypotheses positions are sampled with a scale of 0.02, as the size of the icosahedron is normalized as 1.

11. The network of claim 1, wherein the cross-view perceptual feature pooling module being so configured as to pool the geometry features for each vertex and its hypotheses positions in a cross-view manner, further includes finding the projections for each vertex and its hypothesis positions in the planes of the plurality of input images and then pooling the geometry features for each vertex and its hypothesis positions.

12. The network of claim 11, wherein the projections of each vertex and its hypothesis position are found in the planes of the plurality of input images by using known camera intrinsics and extrinsics.

13. The network of claim 11, wherein the geometry features of each vertex and its hypothesis positions are pooled four neighboring feature blocks.

14. The network of claim 11, wherein the geometry features of each vertex and its hypothesis positions are pooled by using bilinear interpolation.

15. The network of claim 1, wherein the deformation reasoning module includes a scoring network, and wherein the pooled perceptual features of each vertex and its hypotheses positions are fed into the scoring network.

16. The network of claim 15, wherein a weight for each vertex and its hypotheses positions is estimated in the scoring network, and a weighted sum of the vertex and all of its hypotheses positions for each vertex is calculated based on the weight of each vertex and its hypotheses positions and the pooled geometry features of each vertex and its hypotheses positions.

17. The network of claim 15, wherein the coordinates for each vertex is obtained from the weighted sum of the vertex, and the refined mesh is generated according to the coordinates of each vertex.

18. The network of claim 15, wherein the scoring network is a G-ResNet consisting of six graph residual convolution layers, with each layer added with a Rectifier Linear Unit (ReLU).

19. A system for generating 3D shape, comprising an input device, a processor for processing the input data, and an output device for outputting the processed data; wherein the processor is configured to build a computing model including a perceptual network and a Graphic Convolutional Network (GCN), wherein:
the perceptual network is so configured to extract geometry features and semantic features from a plurality of input images;
the GCN includes a coarse shape generation network for generating a coarse shape, and a Multi-View Deformation Network (MDN) for refining the coarse shape; wherein
the coarse shape generation network is so configured as to output a coarse mesh based on the semantic features extracted from the perceptual network and an initial ellipsoid mesh;
the MDN comprises at least one MDN unit, which comprises a deformation hypothesis sampling module, a cross-view perceptual feature pooling module and a deformation reasoning module; wherein
the deformation hypothesis sampling module is so configured that a set of deformation hypotheses positions are sampled for each vertex of the coarse mesh from its surrounding area;
the cross-view perceptual feature pooling module is serial to the deformation hypothesis sampling module, and is so configured as to pool the geometry features for each vertex and its hypotheses positions in a cross-view manner;
the deformation reasoning module is serial to the cross-view perceptual feature pooling module, and is so configured to output a refined mesh based on the pooled geometry features of each vertex and its hypotheses positions.

* * * * *